Jan. 17, 1956  A. T. SINKS  2,730,813
GYROSCOPE
Filed May 19, 1945
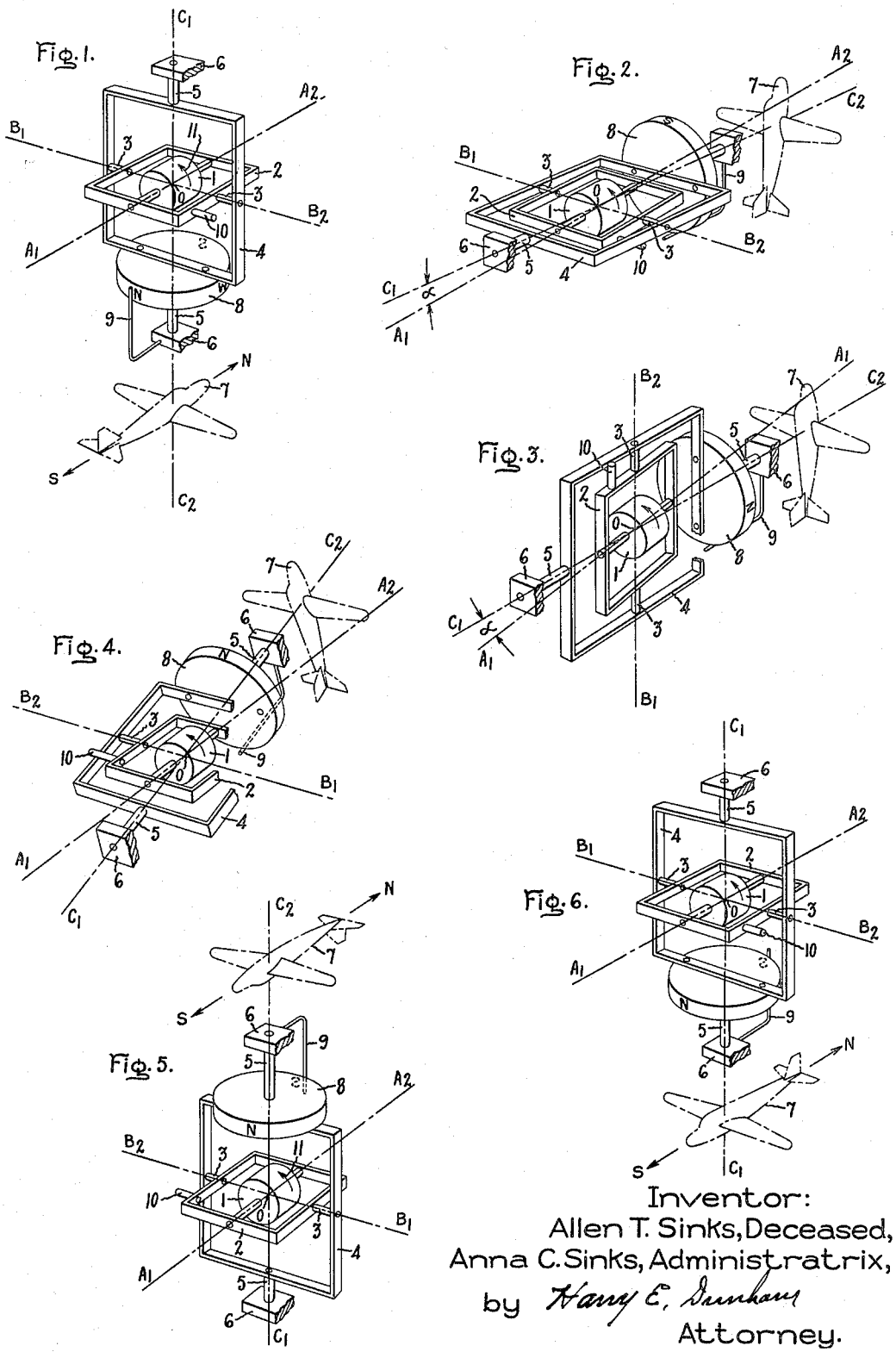
Inventor:
Allen T. Sinks, Deceased,
Anna C. Sinks, Administratrix,
by Harry E. Dunham
Attorney.

United States Patent Office 2,730,813
Patented Jan. 17, 1956

2,730,813

GYROSCOPE

Allen T. Sinks, deceased, late of Beach Bluff, Mass., by Anna C. Sinks, administratrix, Beach Bluff, Mass., assignor to General Electric Company, a corporation of New York Application May 19, 1945, Serial No. 594,628

18 Claims. (Cl. 33—204)

The present invention relates to gyroscopes, and more particularly to gyroscopic instruments used to indicate direction or attitude of an aircraft in flight.

Gyroscopic instruments are widely used on aircraft to indicate angular rotation of the aircraft about the three principal control axes, such instruments being usually referred to as directional and horizon gyroscopes. Most gyroscopic instruments are limited in their range of operation and must be caged if the aircraft on which they are mounted is maneuvered so as to exceed the gyroscope limits. Recently, however, there has been an increasing demand for indicating gyroscopes which allow complete maneuvering of the aircraft without the necessity for caging the gyros. In order to provide such instruments, the gyroscope has been made completely universal, i. e., the gyroscope is completely free to rotate in its gimbal support. Universal gyroscopes, however, have two distinct disadvantages. The first difficulty with these gyroscopes arises when the aircraft is maneuvered so that the gyroscope moves to a so-called gimbal lock position in which the gyro spin axis becomes aligned with one of the gimbal axes. In the gimbal lock position a large error in indication can occur, particularly if a turn is made about the aligned gimbal and spin axes, since the gyroscope has no rigidity with reference to angular rotation about its spin axis. The second difficulty encountered with universal gyros is the fact that it is possible to maneuver the aircraft about the gyro gimbal axes in such a manner that upon a return to level flight the heading of the aircraft is changed 180 degrees without any corresponding change in the gyro indication. Such reverse indications are confusing to the pilot and tend to discourage complete reliance upon the instrument during blind flying operations.

An object of the present invention is to provide a new and improved gyroscopic indicating instrument particularly suited for use on aircraft.

Another object of the present invention is to provide a gyroscopic instrument which permits universal maneuvering of the aircraft without caging the gyroscope, but which does not have the above-mentioned disadvantages of a universal gyroscope.

Another object of the invention is to provide a gyroscopic instrument which will not give reverse readings as a result of aerobatic maneuvers tending to swing the gyroscope through the gimbal lock position.

Further objects and advantages of the invention will become apparent as the following description proceeds.

Briefly, according to the present invention there is provided a gyroscopic instrument which permits universal movement of the aircraft on which it is mounted without caging but which utilizes a gyroscope which is not itself completely universal. This is accomplished by the provision of stop means between the gyroscope and its supporting gimbal which prevents the gyroscope from quite reaching the gimbal lock position. When the stop means is engaged during a maneuver tending to swing the gyroscope to or through the gimbal lock position, gyroscopic torques are developed which quickly swing the gimbal around end-for-end whereupon the gyroscope is free to proceed with its rotation relative to the gimbal without further interference from the stop means. This rotation of the gimbal occurs when the axis of the gimbal rotation and the spin axis of the gyroscope are very near alignment, so that only a small error arises from displacement of the gyroscope spin axis during the gimbal rotation. Furthermore, rotation of the gimbal causes a corresponding rotation of the gyroscope indicator so that the correct sense of indication is maintained, as will be more fully described.

For a better understanding of the invention, reference should be made to the following detailed description taken in connection with the accompanying drawings.

In the drawings, Fig. 1 shows in schematic form a directional gyro azimuth indicating instrument embodying the gimbal stop means forming the subject matter of the present invention; and Figs. 2–6 inclusive show the relative positions of the gyroscope, gimbal, and support as an aircraft, on which the instrument is mounted, executes a half loop-half roll maneuver known as an Immelman turn, such a maneuver demonstrating the operation of the gimbal stop means.

Referring to Fig. 1 of the drawing, there is shown in schematic form a directional gyro azimuth indicating instrument comprising a rotating mass or rotor 1 which is mounted in a frame 2 for rotation about a horizontal spin axis A1, A2. The rotor 1 is driven by any suitable electric or pneumatic motor means, the showing of which has been omitted for the sake of clarity. In the following description and claims, the rotor 1 and the supporting frame 2 will be referred to as a gyroscope. The gyroscope frame 2 is supported by means of trunnions 3 which are rotatably journalled in a gimbal member or support 4 so that the frame 2 is free to pivot or rotate about a minor gimbal axis B1, B2 extending at right angles to the gyro spin axis A1, A2. The gimbal 4 is supported by trunnions 5 which are mounted in relatively fixed supports 6 so that the gimbal 4 is free to rotate about a normally vertical major gimbal axis C1, C2 extending at right angles to the trunnion axis B1, B2. The supports 6 are attached to or form a part of the case of the instrument so that they move with the aircraft on which the instrument is mounted. In order to more clearly illustrate the relationship between the instrument and an aircraft on which the instrument is mounted, an aircraft 7 is shown in phantom, it being understood that the supports 6 are mounted on the aircraft, the orientation of the aircraft relative to the instrument being shown in various figures of the drawing.

Attached to the gimbal 4 is a conventional compass card 8 which is suitably marked with cardinal headings which are read against the stationary index or lubber line 9 mounted on one of the supports 6. The gimbal supporting arrangement for the gyroscope is such that the gyro axes A1—A2, B1—B2, and C1—C2, all intersect at a point O which is also the center of gravity of the gyroscope. This is a conventional Cardan suspension giving three degrees of freedom of gyroscope movement relative to the support 6. Due to the characteristic gyroscopic property of rigidity, the spin axis of the gyroscope tends to stay horizontal and the gimbal 4 and the compass card 8 are stabilized with reference to rotative movements of the support 6 in a horizontal plane. Therefore, the azimuth heading of the aircraft 7 is indicated by reading the headings on the compass card 8 against the fixed lubber line 9.

The directional gyro azimuth indicating instrument as thus far described is entirely conventional. As pointed out above, it is desirable to be able to maneuver the aircraft into all attitudes without having to cage the gyroscope and thereby render it inactive. Heretofore this has been accomplished by making the gyroscope completely universal, i. e., the gimbal 2 is made free to rotate 360 degrees about the gimbal axis B1, B2. With such an arrangement several difficulties are encountered when the aircraft is maneuvered about the gyroscope axes. Thus for example let it be assumed that the aircraft 7 is flying north and that the gyro spin axis A1, A2 is in the direction of flight, as shown in Fig. 1. If now the aircraft is pulled into a vertical climb, the gimbal axis C1, C2 will become aligned with the spin axis A1, A2, this condition being known as the gimbal lock. In this position the gimbal 4 is free to rotate in any position about the axis C1, C2, since the gyroscope offers no resistance to rotation of the gimbal about its spin axis. In this position, therefore, any degree of error in azimuth indication can occur and is likely to occur, particularly if the aircraft is turned about the axis C1, C2 while in a vertical climb.

Another difficulty encountered with a completely universal gyroscope when the aircraft is maneuvered about the gyroscope axes is that reverse indication may occur. Thus, let it again be assumed that the aircraft 7 and the gyroscope are in the position shown in Fig. 1, the aircraft 7 and the gyro spin axis being headed north. If now the aircraft is maneuvered in the half loop to an inverted position, the gimbal 4 will simply rotate 180 degrees about the gimbal axis B1, B2 so that there will be no relative rotation between the compass card 8 and the lubber line 9. Therefore, the indicator will still indicate that the aircraft is flying north, whereas actually it is flying south. If now an Immelman turn is completed by maneuvering the aircraft in a half roll about the axis A1, A2 which is parallel to the longitudinal axis of the aircraft, the aircraft will be restored to an upright position and will still be flying south. It will be noted, however, that rotation of the instrument about the spin axis A1, A2 causes no relative movement between the gimbal 4 and the support 6 so that the indicator still reads north while the aircraft is flying south. Such a reverse indication is confusing to the pilot and renders the instrument unreliable.

According to the present invention the aforementioned difficulties are overcome by the provision of a novel stop arrangement for limiting the movements of the gyroscope relative to the gimbal 4. In the illustrated embodiment of the invention the stop means comprises a stop member 10 which projects outwardly from the gyroscope frame 2 so that it engages the edge of the gimbal 4 when the gimbal rotates relative to the gyroscope about the axis B1, B2 to the limiting position shown in Fig. 2 of the drawing. The stop is arranged so that it engages the gimbal and prevents further rotation thereof when the gimbal rotates to within a few degrees of the gimbal lock position in which the trunnion axis C1, C2 would be in alignment with the gyro spin axis A1, A2. The stop adjustment may be defined in terms of the number of angular degrees $\alpha$ of further rotation of the gimbal to move it to the gimbal lock position. Thus, in Fig. 2 of the drawing, where the stop 10 is shown in engagement with the gimbal 4, the angle $\alpha$ is determined by the intersection of the lines C1, O and A1, O. As shown in Fig. 2, the stop is shown as engaging the gimbal 4 on the side towards the upper gimbal bearing. Obviously, if the gimbal 4 is rotated from the position shown in Fig. 1 in the opposite direction, the stop will engage the gimbal 4 on the side toward the lower gimbal bearing. Preferably, the stop is arranged so that the stop angle $\alpha$ is the same for either engaging position.

The stop adjustment may also be defined in terms of the angular rotation of the gimbal 4 that is permitted in either direction from a position shown in Fig. 1 in which the trunnion axis C1, C2 is perpendicular to the gyro spin axis A1, A2. Thus for example if the stop angle $\alpha$ is two degrees, the gimbal is free to rotate ±88 degrees from the position shown in Fig. 1 so that the total permissible angular rotation of the gimbal is 176 degrees. The stop angle $\alpha$ is preferably small being, for example, in the neighborhood of two degrees. However, other stop angles may be used, depending on design factors and the required instrument accuracy, as will be more fully described below.

The stop 10 engages the gimbal 4 and causes rotation of the gimbal about the trunnion axis C1, C2 whenever the aircraft on which the instrument is mounted maneuvers in such a way that the gyroscope tends to swing to or through the gimbal lock position. The stop, in preventing movement of the gimbal to the gimbal lock position, overcomes the difficulties previously described when the gimbal lock position is reached. Engagement of the stop and gimbal and the resulting rotation of the gimbal about the axis C1, C2 also prevents reversals of the indications in the compass card 8. It is believed that the operation of the stop means in maintaining the correct sense of indication can best be understood by considering the maneuver of the aircraft which causes the stop means to operate.

Let it be assumed that the aircraft 7 is flying north and the gyro spin axis A1, A2 extends in the direction of flight as shown in Fig. 1. The lubber line 9 then lies at the north heading mark on the compass card 8. In the following description of operation, it will be assumed that the pilot executes a maneuver known as an Immelman turn in which the aircraft is flown in a half loop in the inverted position and then is maneuvered in a half roll about the longitudinal axis of the aircraft to the upright position.

During the half-loop maneuver, the angle of climb progressively increases causing rotation of the gimbal about the trunnion axis B1, B2. When the angle of climb is just short of a vertical climb by the amount of the stop angle $\alpha$, the stop 10 engages the gimbal 4 as shown in Fig. 2. Continued rotation of the aircraft to the vertical climb position now causes the gimbal 4 to exert a torque on the gyroscope tending to rotate it counterclockwise about the axis B1, B2, as viewed in Fig. 2. The application of torque to the gyroscope causes it to exert a reactive precessional torque about a vertical axis at right angles to the axis of the applied torque in accordance with the well known law of gyroscopic precession. Assuming that the gyro rotor 1 is rotating counterclockwise as indicated by the arrow 11, there is a small component of this precessing torque about the gimbal axis C1, C2, this torque being in a direction to cause counterclockwise rotation of the gimbal 4. In response to the application of this torque, the gimbal 4 rotates quickly approximately 90 degrees to the position shown in Fig. 3 in which the trunnion axis B1, B2 is approximately vertical, and at this point the aircraft 7 reaches the vertical climb position as shown. It will be noted that from this position continued rotation of the aircraft in the loop no longer causes the stop to press against the gimbal so that the gyro spin axis A1, A2 is once more rigid in space. It will be noted that the 90 degree rotation of the gimbal has caused a displacement of the gyro spin axis in space by an amount of the stop angle $\alpha$, so that the spin axis as shown in Fig. 3 is displaced in a horizontal plane from the gimbal axis C1, C2 by the amount of the stop angle $\alpha$. As the aircraft continues in the loop, the gimbal axis C1, C2 continues to rotate counterclockwise about an axis at right angles thereto and extending in the direction of the athwartship axis of the aircraft. The resisting torque of the gyro causes a continued rotation of the gimbal about the axis C1, C2, which movement continues until the gimbal has rotated approximately 180 degrees from the position shown in Figs. 1 and 2. Most of the second 90 degrees of rotation of the gimbal occurs during the first few degrees of rotation of the aircraft beyond the vertical climb position as shown in Fig. 4. When the aircraft reaches the inverted position at the end of the half loop, as shown in Fig. 5, the substantially 180 degree rotation of the gimbal is complete. The reason for the continued movement of the gimbal 4 beyond the 90 degree position shown in Fig. 3 becomes apparent when it is realized that the axes A1, A2 and B1, B2 must remain at right angles to each other, and the axes B1, B2 and C1, C2 must remain at right angles to each other due to the constraint imposed by the gimbal trunnions. Therefore, assuming the gyro spin axis A1, A2 to be rigid in space in the position shown in Fig. 3, the continued rotation of the gimbal axis C1, C2 is possible only when accompanied by a rotation of the gimbal about the axis C1, C2 in a counter-clockwise direction. It will be noted by reference to Fig. 4 that as the aircraft continues in the loop beyond the vertical climb position, the stop 10 moves away from the gimbal so that the gyro is again free during the continuance of the maneuver.

The 180 degree rotation of the gimbal during the half-loop maneuver causes a corresponding 180 degree rotation of the attached compass card 8 so that when the aircraft reaches the inverted position shown in Fig. 5, the lubber line 9 is at the south heading mark, which corresponds with the fact that the aircraft is now flying south. There will be a slight error in the indication due to the displacement of the gyro spin axis by the amount of the stop angle $\alpha$. However, if the stop angle $\alpha$ is made small, this error will be correspondingly small.

If now the Immelman turn maneuver is completed by a half roll of the aircraft, the instrument and the aircraft return to the upright position shown in Fig. 6. It will be noted by reference to Fig. 5 and Fig. 6 of the drawing that the half-roll maneuver causes substantially no movement of the gimbal and the card 8 relative to the lubber line 9 since the longitudinal axis of the aircraft about which the roll is made is substantially parallel to the gyro spin axis A1, A2. The indicator will therefore read south, which corresponds to the fact that the aircraft is still flying south.

If the aircraft should return to the upright position from the inverted position of Fig. 5, by completing a loop instead of executing the half roll Immelman maneuver described above, it will be evident that the stop will again engage the gimbal when the aircraft is approximately in the vertical dive position. This will cause the gimbal to rotate 180 degrees back to its original position shown in Fig. 1, so that the indicator will again read north, which corresponds to the fact that the aircraft will once more be flying north.

If the Immelman turn maneuver should be executed with the gyro spin axis A1, A2 athwartship rather than in the direction of flight, as assumed above, it will be evident that the stop will engage the gimbal and cause rotation thereof in the vertical bank position rather than in the vertical climb position. In either case, however, the correct sense of indication is obtained when the aircraft returns to the level flight position.

If during an Immelman turn or loop maneuver the gyro spin axis A1, A2 is displaced from the fore and aft position or the athwartship position by more than the stop angle $\alpha$, it will be evident that the stop will not engage the gimbal and the instrument will operate in the conventional manner. No difficulty will be encounted in this case since there will be no tendency for the gimbal to swing to or through the gimbal lock position.

Thus it will be apparent from the foregoing that the stop 10 prevents the gimbal 4 from ever moving to the gimbal lock position, and also in causing rotation of the gimbal whenever the gimbal lock position is approached, maintains the correct sense of indication regardless of the maneuvering of the aircraft on which the gyro instrument is mounted.

The stop angle $\alpha$ should be made as small as possible since the greater the stop angle, the greater will be the displacement of the gyro spin axis and the resulting error in azimuth indication upon rotation of the gimbal in response to the engagement of the stop. The component of the gyroscopic torque tending to rotate the gimbal upon engagement of the stop is a function of the sine of the stop angle $\alpha$, and therefore it will be seen as the stop angle $\alpha$ is made progressively smaller, a point will be reached where the gyroscopic torque is no longer sufficient in a given instrument to cause rotation of the gimbal. The minimum stop angle which can be tolerated in a given instrument will depend upon the inertia of the gimbal and the friction of the gimbal bearings. It has been found from tests that with gyroscopic instruments of the size conventionally used on aircraft which are adjusted for the normal amount of gimbal friction, successful operation of the stop is obtained with the stop angle adjusted to about two degrees. Reasonably good operation can be obtained with the stop angles as high as ten degrees, or with a gimbal freedom of $\pm 80$ degrees from the position shown in Fig. 1 of the drawing. For a stop angle greater than ten degrees, the displacement of the gyro spin axis upon rotation of the gimbal becomes so large that the utility of the device is greatly decreased and furthermore the gyro is likely to upset or tumble. As pointed out before, however, with gyroscopic instruments of ordinary gimbal inertia and bearing friction, successful operation is obtained with a small stop angle so that the resulting azimuth error indication is very small.

The location, shape and form of the stop means for limiting the gimbal movement is immaterial, the only requirement being that the stop means limit the angular movement of the gimbal relative to the gyroscope to the range specified, which range excludes the gimbal lock position. It should be clearly understood, therefore, that many other forms of stop arrangements may be used without departing from the invention.

The gimbal stop arrangement forming the subject matter of the present invention is not limited to the illustrated embodiment wherein it is shown as used on a directional gyro azimuth indicating instrument. The gimbal stop arrangement may be equally well used on a horizon gyroscope, or on any other gyroscopic indicating instrument where it is desired to avoid the difficulties encountered when the gimbal moves to or through the gimbal lock position.

While there are shown and described particular embodiments of the invention, it will occur to those skilled in the art that various changes and modifications may be made without departing from the invention, and it is therefore intended in the appended claims to cover all such changes and modifications as fall within the true spirit and scope of the invention.

What is claimed as new and desired to secure by Letters Patent of the United States is:

1. A gyroscopic device comprising a gyroscope, means for pivotally mounting said gyroscope on a gimbal member so that it is free to rotate relative to said gimbal member about a first gimbal axis extending at right angles to the spin axis of said gyroscope, a support, means for pivotally mounting said gimbal member on said support so that said gimbal is free to pivot relative to said support about a second gimbal axis extending in a direction at right angles to said first gimbal axis, and stop means between said gyroscope and said gimbal member for preventing movement, which would otherwise be permitted, of said gyroscope relative to said gimbal member to a gimbal lock position in which the gyroscope spin axis would become aligned with said second gimbal axis, said stop means becoming effective when said spin axis is within a few degrees of said gimbal lock position and causing said gimbal to rotate approximately 180 degrees upon movement of said support relative to said gyroscope in such a manner that said spin axis would pass through said gimbal lock position in the absence of said stop means, said gimbal rotation causing a disengagement of said stop means upon a continued movement of said support relative to said gyroscope whereby free movement between said gyroscope and said gimbal is reestablished.

2. A gyroscopic device comprising a support, a gyroscope, a gimbal member, means for pivotally mounting said gyroscope on said gimbal member so that it is free to pivot about a first axis perpendicular to the spin axis of said gyroscope, means for mounting said gimbal member on said support so that it is free to pivot about a second axis perpendicular to said first axis, and stop means for preventing said gimbal member from rotating to a position in which said second axis becomes aligned with said gyroscope spin axis, said stop means being constructed and arranged to permit at least plus or minus 80 degrees of rotation of said gimbal member relative to said gyroscope from a position in which said second axis is perpendicular to said gyroscope spin axis.

3. A gyroscopic device comprising a support, a gyroscope, a gimbal member, means for pivotally mounting said gyroscope on said gimbal member so that it is free to pivot about a first axis perpendicular to the spin axis of said gyroscope, means for rotatably mounting said gimbal member on said support so that it is free to rotate about a second axis perpendicular to said first axis, and stop means for preventing said gimbal member from rotating to a position in which said second axis would become aligned with said gyroscope spin axis, said stop means being constructed and arranged to permit said gimbal member to move freely relative to said gyroscope to within about two degrees of said gimbal lock position.

4. A gyroscopic device comprising a gyroscope, a gimbal member for supporting said gyroscope so that it is free to rotate about two mutually perpendicular axes, and stop means for preventing rotative movement of said gyroscope relative to said gimbal member to a gimbal lock position in which the spin axis of said gyroscope would become aligned with one of said axes, said stop means being constructed and arranged to permit free movement of said gyroscope in said gimbal member of at least 160 degrees but less than 180 degrees.

5. A gyroscopic instrument for aircraft comprising a support fixed relative to said aircraft, a gyroscope comprising a rotating element mounted in a frame, a gimbal member, means for mounting the frame of said gyroscope on said gimbal member so that said gimbal member is free to pivot about a first axis perpendicular to the spin axis of said gyroscope, means for mounting said gimbal member on said support so that it is free to rotate about a second axis perpendicular to said first axis, an indicator actuated by relative movement between said support and said gimbal member, and stop means for preventing said gimbal member from rotating to a gimbal lock position in which said second axis would become aligned with said gyroscope spin axis, said stop means being constructed and arranged to permit at least plus or minus 80 degrees rotation of said gimbal member relative to said gyroscope frame from a position in which said second axis is perpendicular to said gyroscope spin axis, said stop means acting when engaged to cause rotation of said gimbal member and said indicator during maneuvers of said aircraft which would cause movement of said gimbal member to or through said gimbal lock position in the absence of said stop means whereby the correct indicating sense of said indicator is maintained during such maneuvers.

6. A directional gyro azimuth indicator for aircraft comprising a support, a gyroscope, a gimbal member, means for mounting said gyroscope on said gimbal member so that the spin axis of said gyroscope is approximately horizontal and so that the gyroscope is free to pivot about a first axis at right angles to said spin axis, means for mounting said gimbal member on said support so that it is free to rotate about a second axis at right angles to said first axis, said second axis being normally vertical, an azimuth indicator actuated by rotative movements of said gimbal member relative to said support about said second axis, and stop means for preventing said gimbal member from rotating about said first axis to a gimbal lock position in which said second axis would become aligned with said gyroscope spin axis, said stop means being constructed and arranged to permit at least plus or minus 80 degrees rotation of said gimbal member relative to said gyroscope from a position in which said second axis is perpendicular to said gyroscope spin axis, said stop means acting when engaged to cause rotation of said gimbal and said indicator during maneuvers of said aircraft which would cause movement of said gimbal member to or through said gimbal lock position in the absence of said stop means whereby the correct indicating sense of said indicator is maintained.

7. A directional gyro azimuth indicator for aircraft comprising a support, a gyroscope, a gimbal member, means for mounting said gyroscope on said gimbal member so that the spin axis of said gyroscope is approximately horizontal and so that the gyroscope is free to pivot about a first axis at right angles to said spin axis, means for mounting said gimbal member on said support so that it is free to rotate about a second axis at right angles to said first axis, said second axis being normally vertical, an azimuth indicator actuated by rotative movements of said gimbal member relative to said support about said second axis, and stop means for preventing said gimbal member from rotating about said first axis to a gimbal lock position in which said second axis would become aligned with said gyroscope spin axis, said stop means being constructed and arranged to permit said gimbal member to move freely relative to said gyroscope to within about two degrees of said gimbal lock position, said stop means acting when engaged to cause rotation of said gimbal and said indicator during maneuvers of said aircraft which would cause movement of said gimbal member to or through said gimbal lock position in the absence of said stop means whereby the correct indicating sense of said azimuth indicator is maintained.

8. In a gyroscopic direction indicator, a bearing frame carrying a gyro rotor, a gimbal member on which said bearing frame is mounted for rotation about a minor gimbal axis, said gimbal member being mounted on a support for 360° rotation about a major gimbal axis, stop means arranged to limit otherwise free rotation of said bearing frame on said gimbal member to a few degrees less than 180° and to prevent movement of said bearing frame to a gimbal lock position in which the gyro rotor spin axis would become aligned with said major gimbal axis, and a direction indicator actuated in accordance with rotation of said gimbal about said major gimbal axis, said stop means acting to prevent reverse indications of said indicator by causing said gimbal to rotate approximately 180° about said major gimbal axis whenever said support is moved so as to cause engagement of said stop means, said 180° gimbal rotation taking place without appreciable displacement of the gyro rotor spin axis and therefore without appreciable error in direction indication.

9. In a universal gyroscope instrument, a bearing frame on which a gyro rotor is rotatably mounted, a gimbal member on which said bearing frame is mounted for rotation about a minor gimbal axis perpendicular to the gyro rotor spin axis, said gimbal member being mounted on a support for 360° rotation about a major gimbal axis perpendicular to said minor gimbal axis, an indicator actuated by said gimbal member, and gimbal-reversing means for causing said indicator and gimbal to rotate approximately 180° whenever movement of said support causes the gyro rotor spin axis and major gimbal axis to closely approach alignment, said gimbal-reversing means comprising a stop acting between said bearing frame and said gimbal member.

10. In a universal gyroscope instrument, a bearing frame on which a gyro rotor is rotatably mounted, a gimbal member on which said bearing frame is mounted for rotation about a minor gimbal axis perpendicular to the gyro rotor spin axis, said gimbal member being mounted on a support for 360 degrees rotation about a major gimbal axis perpendicular to said minor gimbal axis, an indicator actuated by said gimbal member, and gimbal reversing means for causing said gimbal member to rotate approximately 180° whenever relative rotation of said bearing frame and gimbal member is such that the gyro rotor spin axis tends to pas through a position of alignment with said major gimbal axis, said gimbal reversing means comprising stop means arranged to momentarily connect said bearing frame and said gimbal member at a point just short of said position of alignment, said stop means being automatically released upon rotation of said gimbal member and continued relative rotation of said bearing frame and said gimbal member.

11. In a universally maneuverable gyro for aircraft, a casing, a ring pivotally mounted in said casing with full freedom about a first axis, a rotor frame mounted on the ring to pivot about a second axis perpendicular to the first axis; and means for preventing reversal in the relation between the rotor frame and ring when the axis of the ring moves through a gimbal lock position during movement of the craft comprising a pair of stops and a limit piece, one of which is mounted on the frame and the other of which is mounted on the ring, said piece engaging the stops to limit the movement between the frame and ring to a range of between ±75 and ±89 degrees from the normal positions thereof.

12. In a universaly maneuverable gyro for aircraft, a casing, a gimbal ring pivotally mounted in said casing with full freedom about a first axis parallel to one axis of the craft, a rotor case mounted on the ring to pivot about a second axis parallel to another axis of hte craft; and means for preventing reversal in the relation between the rotor case and ring when the axis of the ring moves through a gimbal lock position during movement of the craft comprising a pair of stops on the case and a limit piece on the ring that engages the stops to limit the movement between the case and ring to a range of not more than ±89 degrees and not less than ±75 degrees from the normal positions thereof.

13. In a universally maneuverable gyro for aircraft, a casing, a gimbal ring pivotally mounted in said casing with full freedom about a first axis parallel to one axis of the craft, a rotor case mounted on the ring to pivot about a second axis parallel to another axis of the craft; and means for preventing reversal in the relation between the rotor case and ring when the axis of the ring moves through a gimbal lock position during movement of the craft comprising a pair of stops on the ring and a limit piece on the case that engages the stops to limit the movement between the case and ring to a range of not more than ±89 degrees and not less than ±75 degrees from the normal positions thereof.

14. Means for preventing gimbal lock in a universally maneuverable gyro with a ring mounted to pivot with full freedom about a first axis and a rotor frame mounted on the ring to pivot about a second axis perpendicular to the first axis comprising a pair of oppositely disposed stops and a limit piece cooperating with said stops to limit the movement between the frame and ring to not more than ±89 degrees and not less than ±75 degrees from the normal positions thereof.

15. Means for preventing gimbal lock in a universally maneuverable gyro with a gimbal ring and rotor case comprising a pair of stops on the case and a limit piece on the ring that cooperate to confine the relative movement between the case and ring to a range of between ±75 degrees and ±89 degrees from the normal positions thereof.

16. Means for preventing gimbal lock in a universally maneuverable gyro with a gimbal ring and rotor case comprising stops on the ring and on the case respectively that cooperate to confine the relative movement between the case and ring to a range of between ±75 degrees and ±89 degrees from the normal positions thereof.

17. In an aircraft directional gyro with a casing, a ring mounted in said casing to pivot about a normally vertical axis, a rotor frame mounted on the ring to pivot about a normally horizontal axis; and means for preventing reversal in the relation between the rotor frame and ring when the axis of the ring moves through a horizontal position during movement of the craft comprising complementary stops on said frame and on said ring that cooperate to limit the movement between the frame and ring to a range of less than 90 degrees but greater than 80 degrees from the vertical.

18. In a universally maneuverable directional gyro for aircraft, a vertical ring providing an azimuth reference, a rotor case pivotally mounted in said ring with freedom about a normally horizontal axis, and gimbal lock preventing means effective to positively move the ring during acrobatic maneuvers of the craft so that when the craft reassumes its normal attitude with the ring in an uninverted condition it unfailingly provides an unambiguous reference, comprising cooperable limit stops on the ring and case that limit the range of relative tilt therebetween to between ±80 degrees and ±89 degrees from the normal positions thereof.

References Cited in the file of this patent

UNITED STATES PATENTS

| | | |
|---|---|---|
| 1,974,220 | Sperry | Sept. 18, 1934 |
| 2,036,229 | Moss | Apr. 7, 1936 |
| 2,099,705 | Reichel | Nov. 23, 1937 |
| 2,159,099 | Moss | May 23, 1939 |
| 2,253,119 | Goerth | Aug. 19, 1941 |
| 2,327,623 | Crew | Aug. 24, 1943 |
| 2,395,250 | Carlson | Feb. 19, 1946 |
| 2,452,473 | Kellogg | Oct. 26, 1948 |